United States Patent

[11] 3,561,425

| [72] | Inventor | James Geary Gardner<br>Riddings Cottage, Harestone Hill,<br>Caterham, Surrey, England |
|---|---|---|
| [21] | Appl. No. | 737,473 |
| [22] | Filed | June 17, 1968 |
| [45] | Patented | Feb. 9, 1971 |
| [32] | Priority | June 22, 1967 |
| [33] | | Great Britain |
| [31] | | 28783/67 |

[54] SOLAR HEATERS
2 Claims, 4 Drawing Figs.

| [52] | U.S. Cl. | 126/271 |
|---|---|---|
| [51] | Int. Cl. | F24j 3/02 |
| [50] | Field of Search | 126/270, 271 |

[56] References Cited
UNITED STATES PATENTS

| 3,215,134 | 11/1965 | Thomason | 126/271 |
|---|---|---|---|
| 1,130,870 | 3/1915 | Willsie | 126/271X |
| 3,077,190 | 2/1963 | Allen | 126/271 |
| 3,146,774 | 9/1964 | Yellott | 126/271 |
| 3,236,294 | 2/1966 | Thomason | 126/271X |
| 3,254,643 | 6/1966 | Thomason | 126/271 |

*Primary Examiner*—Charles J. Myhre
*Attorney*—Norris & Bateman

ABSTRACT: A Solar Heater comprising a bank of panels each consisting of an inclined wooden frame supporting a heat collecting lamina and an adjacent backing surface the lamina collecting sunlight and the backing surface having a horizontal top edge over which liquid is supplied and is heated as it descends between the lamina and the backing surface.

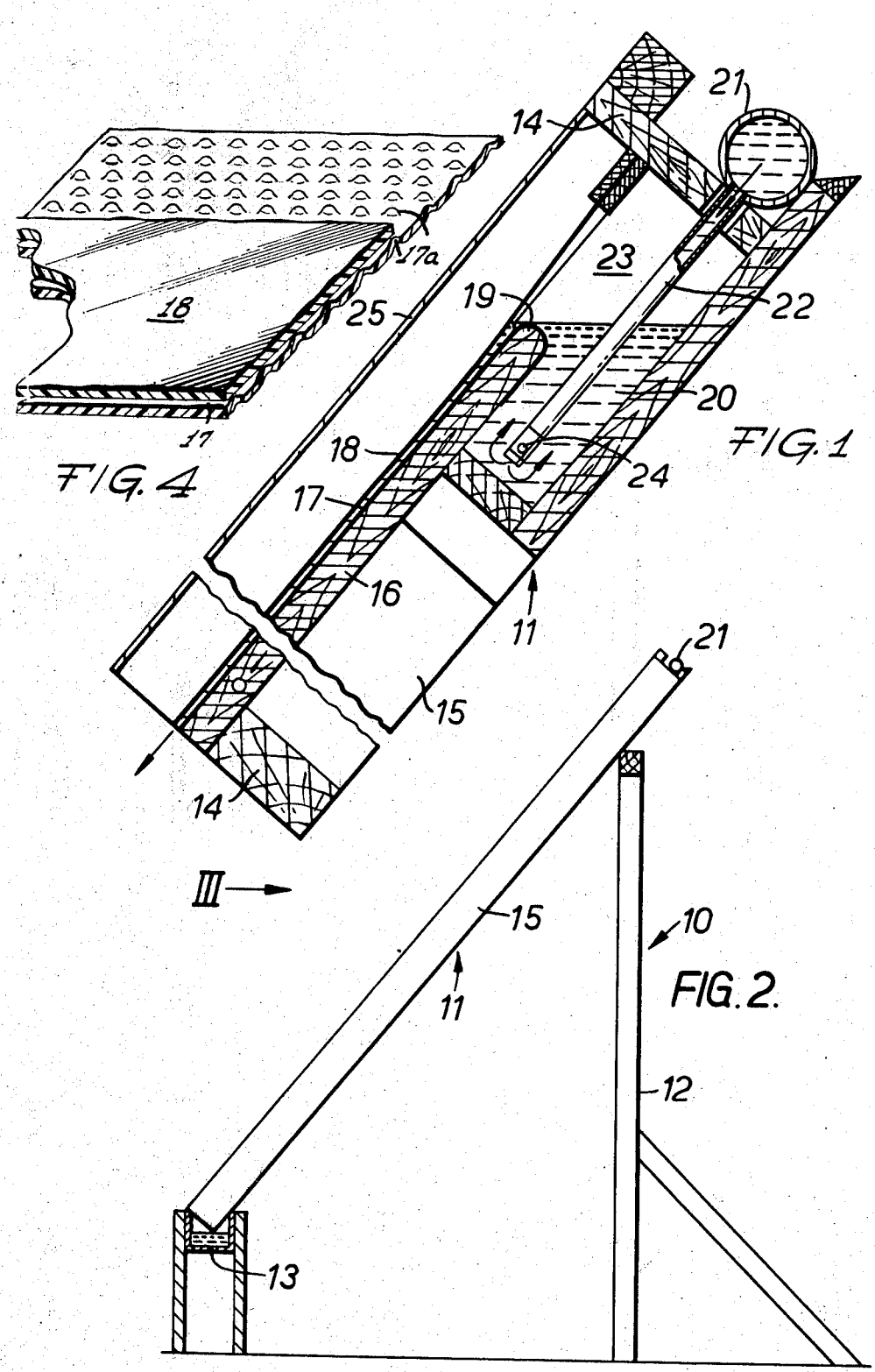

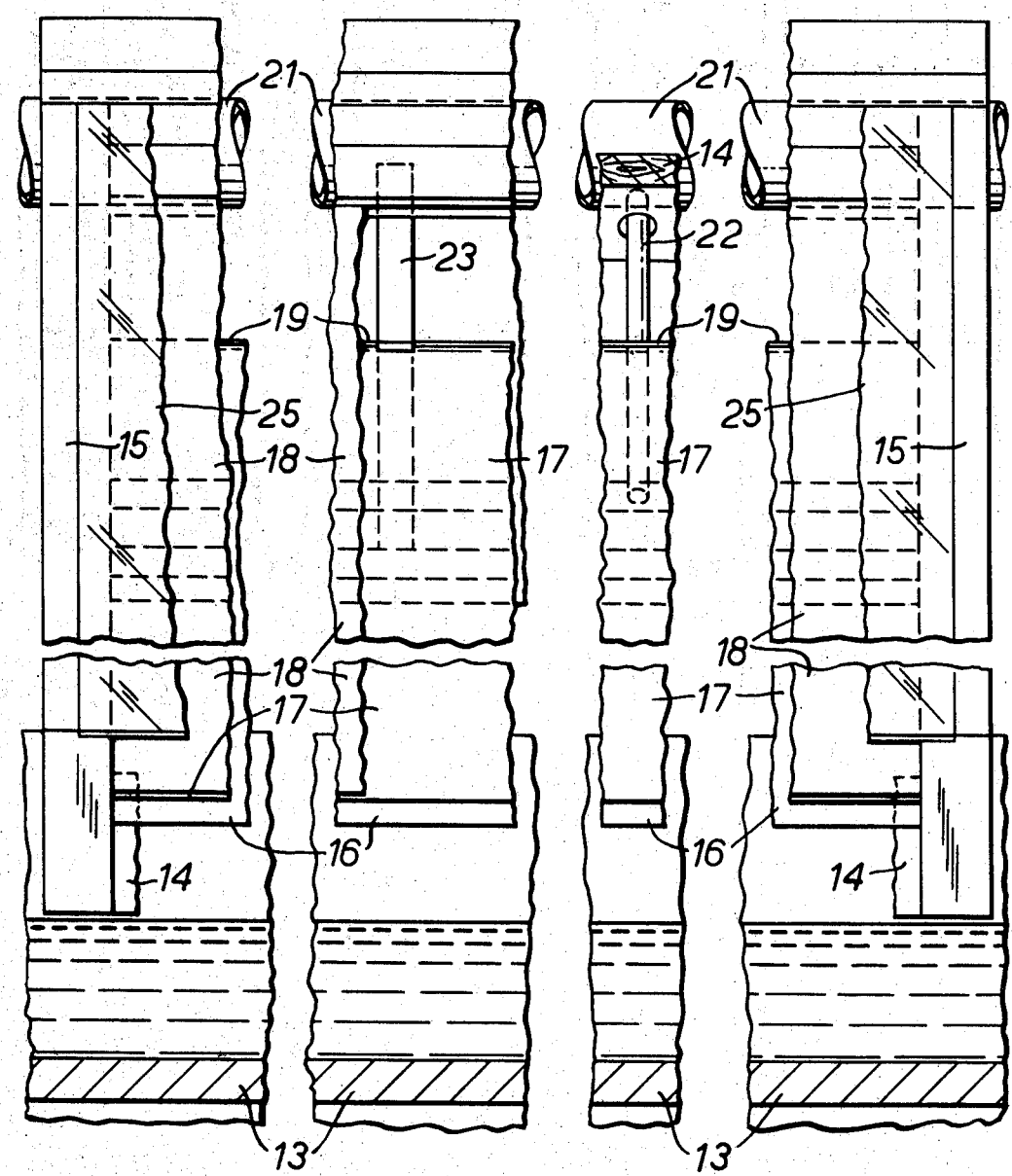

SOLAR HEATERS

The invention relates to a solar heating unit.

It is well known to construct solar heaters in unit panels each having a matte black surface to face the sun and tubing for the liquid to be heated in thermal contact with this surface.

Such heaters generally form part of a closed circuit and are used for heating the water of swimming pools and domestic water supplies.

According to the present invention there is provided a solar heating unit including a frame supporting a heat collecting lamina and an adjacent backing surface which, in operation are inclined to the horizontal, the lamina collecting sunlight and the backing surface having a horizontal top edge over which liquid is supplied and is heated as it descends between the lamina and the backing surface.

Such units preferably form panels which can be joined as units of a heater and which are suited to open circuit heating.

An embodiment of a solar heater according to the invention will now be described with reference to the accompanying drawings in which:

FIG. 1 is a vertical section of a panel of the heater,

FIG. 2 is a diagrammatic side elevation of the heater,

FIG. 3 is an elevation of the heater as viewed from the side III in FIG. 2, and

FIG. 4 is a fragmentary, partially sectioned, perspective view of the plastic sheets forming part of the heat collecting lamina and adjacent backing surface.

Referring to the FIGS. a solar heater 10 comprises a row of unit panels 11 erected facing the sun at an inclination of 40° — 50° to the horizontal on a supporting structure 12. The lower edges of the panels rest on the walls of a trough 13 which extends along the row.

Each panel includes a rectangular wooden frame of sidepieces, the top and bottom pieces 14 being 4 feet and the vertical pieces 15 being 8 feet long. The frame supports a rigid base 16 which is typically ½ inch plywood or other material able to withstand direct sunlight braced on the underside to prevent sagging. A sheet of polythene 17 covers this base and a sheet of PVC 18 with a matt black finish to absorb the sunlight extends across the polythene. The surface of the polythene sheet 17 is formed with bubbles or dimples 17A so that the water flowing over it is spread across the surface. The base has a horizontal top edge 19 which forms a weir over which water flows from a trough formed behind the base and thence between the plastics sheets. The trough is supplied with water from a supply pipe 21 resting on the tops of the panels and having branch pipes 22 feeding the troughs. The trough is split into compartments by baffles 23 and each compartment is fed by a branch pipe having its own valve 24 for the control of the supply. In this way an even distribution of water flow across the top edge 19 of the base may be achieved.

The flow of water could be thermostatically controlled and at the approximate rate of 100 gallons per hour per panel in strong sunlight, this water being heated directly by the absorption of sunlight by the outer plastics surface 18 as it flows under gravity. The rise in temperature will of course depend upon the intensity of sunlight as well as upon the rate of water flow but it should generally be sufficient for the purpose of heating water in an open circuit for swimming pools and the like.

The front of the panel has a cover of rigid glazing 25, which may be of glass or of a transparent plastics material and the back of the panel may have an insulating layer to reduce heat losses, especially from wind.

In an alternative embodiment a trough is formed in the lower end of each panel for the collection of heated water, the troughs are linked by pipes. The lower trough 13 is then not required.

The two sheets of plastics 17 and 18 may be replaced by rigid plates having horizontal corrugations and spaces to provide the required separation between the plates.

The bank of panels and the supporting structure may be mounted to be rotatable about a vertical axis so that they may be swung round to follow the sun.

The solar heater described is suitable for heating the water of a swimming pool when it is preferably situated between a pool filter system and the pool. If the heater is below the level of the pool a pump may be used to raise the water leaving the heater to the level of the pool. Alternatively the water from the heater can flow back to a supply tank having an output pump which directs a portion of the water to the heater and a portion to the pool.

I claim:

1. A solar heating unit comprising a frame, a heat collecting lamina and an adjacent backing surface each supported on said frame in a position inclined to the horizontal, said heat collecting lamina being a flexible sheet of plastic material with a matte black surface, said adjacent backing surface including a plastic sheet having a plurality of dimples engaging said flexible sheet to provide a space between said sheets, said backing surface also having a horizontal top edge over which liquid is supplied, the liquid being heated as it descends between said sheets and is spread thereacross by said dimples, means on said frame defining a trough extending alongside the top edge of said backing surface to receive the liquid to be heated and distribute it along the top edge of said backing surface, said trough being divided transversely into compartments, and a manifold pipe disposed above said trough having a plurality of outlets for supplying liquid to the respective compartments.

2. A solar heater unit as defined in claim 1 comprising a trough located below said backing surface receiving the liquid descending between said plastic sheets.